Feb. 4, 1936.  C. O. MARSHALL  2,030,013
COMPUTING WEIGHING SCALE
Filed Nov. 5, 1932   3 Sheets-Sheet 1
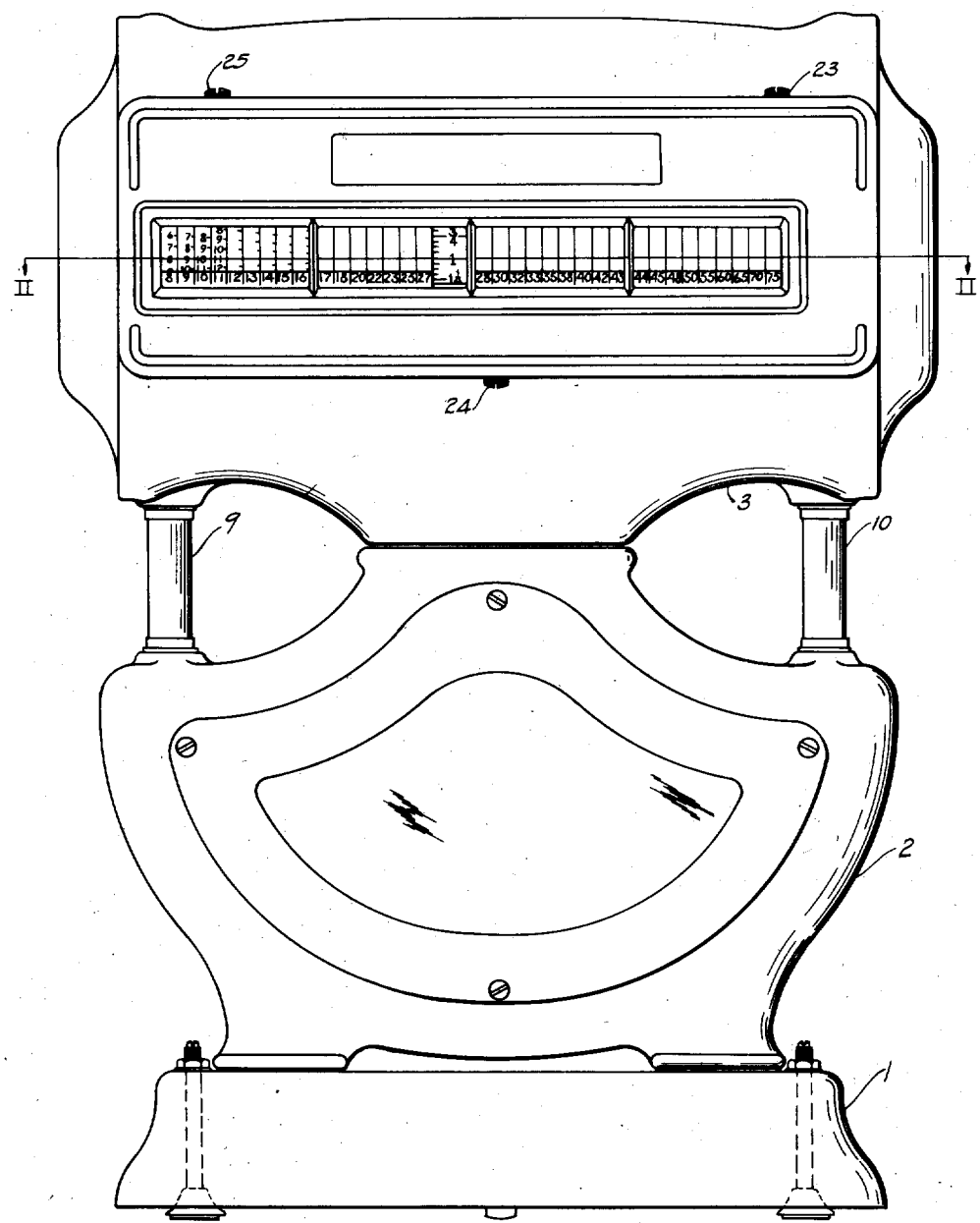
Fig. I
INVENTOR
Charles O. Marshall Feb. 4, 1936.   C. O. MARSHALL   2,030,013
COMPUTING WEIGHING SCALE
Filed Nov. 5, 1932   3 Sheets-Sheet 2
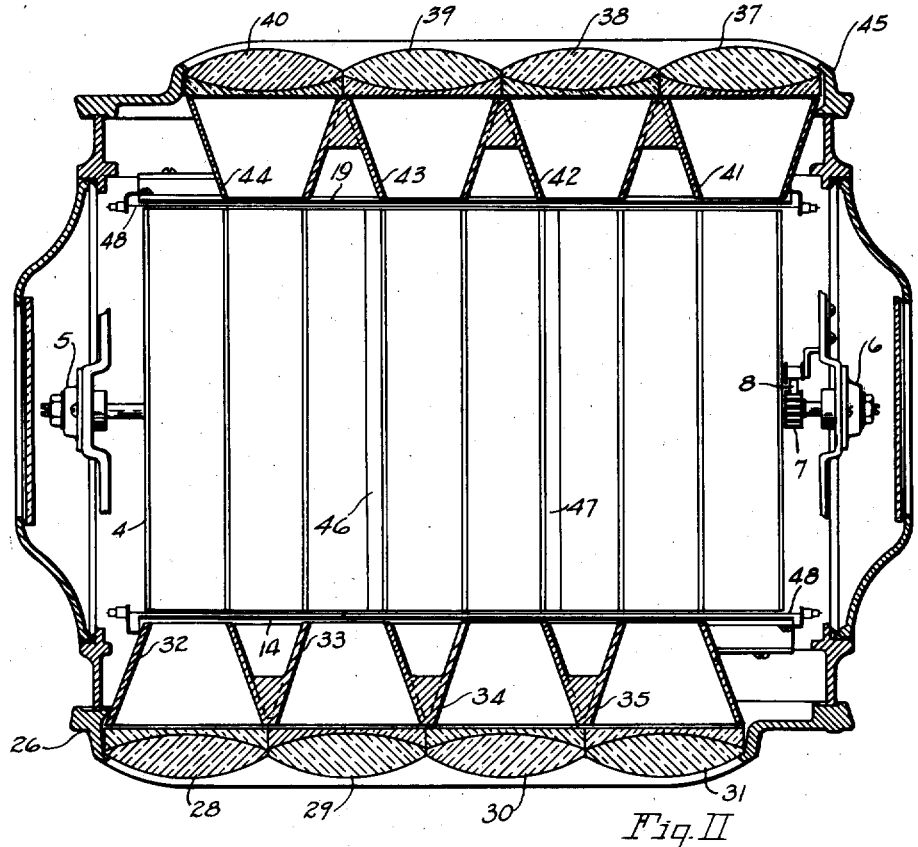
Fig. II
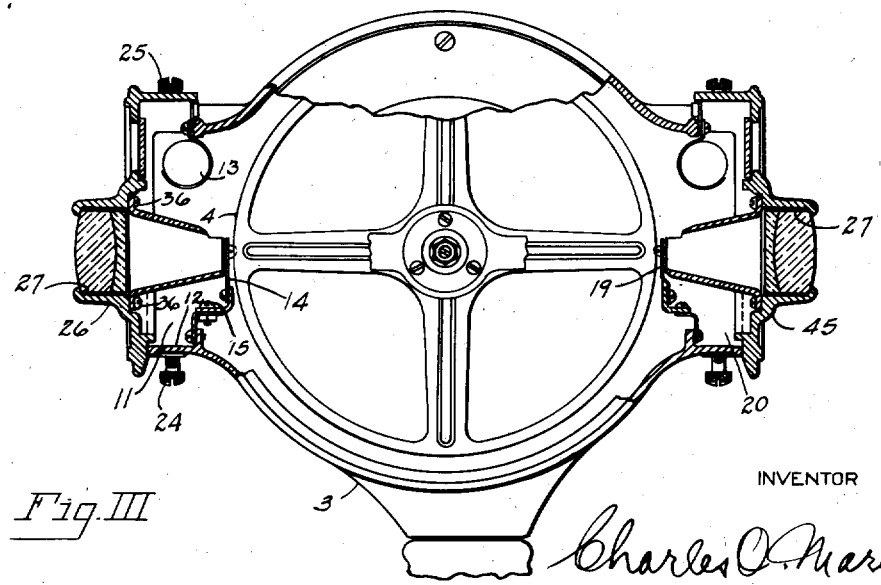
Fig. III
INVENTOR
Charles O. Marshall Feb. 4, 1936. C. O. MARSHALL 2,030,013
COMPUTING WEIGHING SCALE
Filed Nov. 5, 1932  3 Sheets-Sheet 3
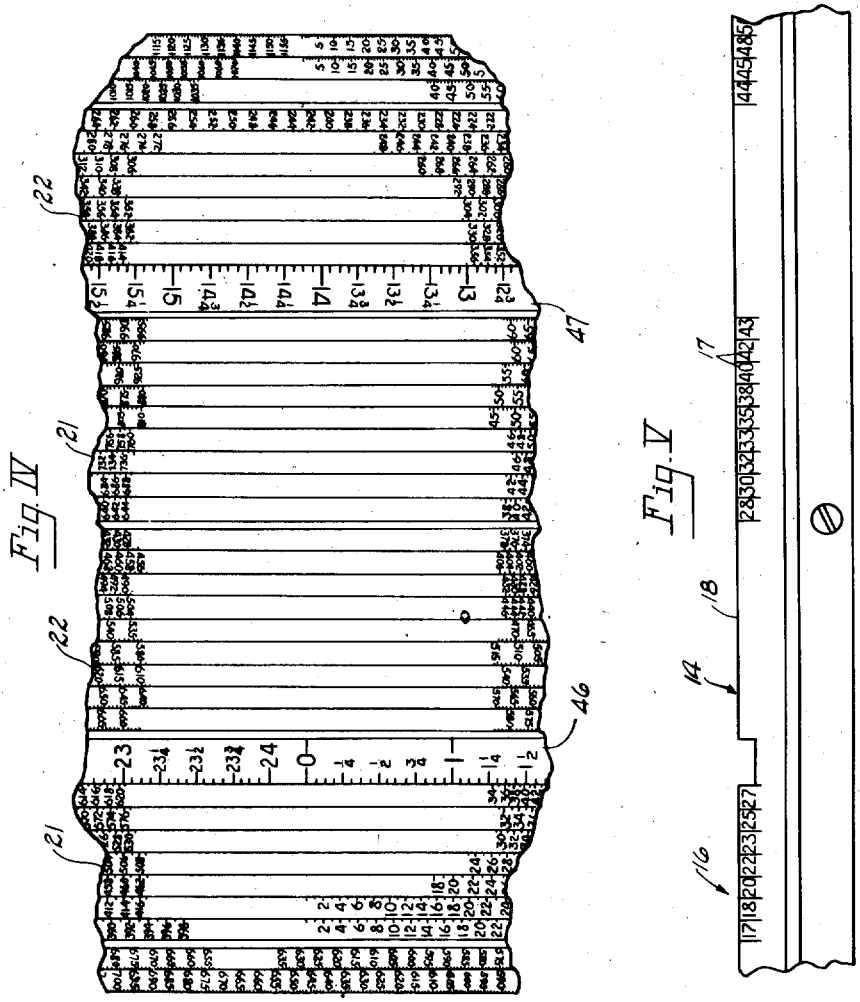
INVENTOR
Charles O. Marshall Patented Feb. 4, 1936

2,030,013

UNITED STATES PATENT OFFICE 2,030,013

COMPUTING WEIGHING SCALE

Charles O. Marshall, Toledo, Ohio, assignor to Toledo Scale Manufacturing Company, Toledo, Ohio, a corporation of New Jersey Application November 5, 1932, Serial No. 641,363

13 Claims. (Cl. 88—1)

The invention relates to computing weighing scales and particularly to the means for indicating the computed values simultaneously to the merchant and the buyer. Heretofore, attempts have been made in automatic computing scales to show computed value characters to both the merchant and the customer. The results of these attempts, however, were not satisfactory in scales of the so-called cylinder type since the cylindrical chart necessarily had to be provided with two identical sets of value characters. One of these sets of characters faced the merchant and the other the customer, each set of value computations extending entirely around the chart. The arrangement was such that one-half of the indicia in view on either side of the chart were upside down and, therefore, unreadable, and the number of prices at which values were computed was thus necessarily reduced. Attempts have been made to divide the circumferential surface of the chart into two zones, with computed values for the merchant printed on one zone extending halfway around the circumference and the identical values adapted to be viewed by the customer on the remaining zone. This is even less satisfactory since the arrangement reduces the indicating capacity of the scale by fifty per cent. The principal object of this invention is, therefore, the provision of means for indicating identical weight and value characters, which extend around the entire circumference of the chart, to both the merchant and his customer in such a manner so that only the proper characters are visible on each side of the scale without substantial reduction in the number of prices.

Another object is the provision of means whereby such spaced sets of computations appear to occupy the entire width of the chart.

Another object is the provision of means for indicating numerically undiminished identical indicia on opposite sides of the device without increasing its physical dimensions.

A still further object is the provision of means to improve the legibility of price and value characters of the indicating device and to minimize liability of error in reading the indication.

Other objects and advantages will be apparent from the following specification in which reference is had to the accompanying drawings illustrating a preferred embodiment of my invention and wherein similar reference numerals refer to similar parts throughout the several views.

In the drawings:

Figure I is an elevational view showing the customer's side of a weighing scale embodying my invention.

Figure II is a plan sectional view of the device, the casing parts being sectioned substantially along the line II—II of Figure I.

Figure III is an end elevational view of the upper part of the scale, parts being broken away.

Figure IV is an enlarged fragment of the indicating chart showing in detail the method of disposing the indicia or characters thereon; and Figure V is an enlarged fragmentary section of the unit price indicating plate.

Referring to the drawings in detail, the rigid base 1 supports an upwardly extending housing 2, surmounted by a chart casing 3, within which a cylindrical chart 4 is supported upon bearings 5 and 6 which permit it to revolve freely about its axis. The chart is connected by means of pinion 7 and a rack 8 (Figure II) or other suitable means which may extend downwardly through one or both of the tubular posts 9 and 10 to a scale lever and counterbalancing mechanism that may be of any desired construction and which is, therefore, not more particularly illustrated or described. However, I refer to United States Patent No. 1,166,128 to C. H. Hapgood as illustrating a type which is particularly well adapted to be associated with the embodiment of my invention.

The chart casing 3 is provided with an elongated opening 11 in its forward or merchant's side which is substantially surrounded by a flange 12. Mounted along the side of the opening 11 is an elongated incandescent lamp 13, which when the scale is in use brilliantly illuminates the forward side of the chart 4 as well as a stationary price range plate 14 which is mounted by means of screws 15 along the lower side of the opening 11. The price range plate is marked with sets 16 of value indicia 17 interspersed by blank spaces 18 (see Figure V).

A similar price range plate 19 is mounted in the elongated opening 20 on the opposite or customer's side of the scale. The surface of the chart 4 is provided with sets of computed value characters 21 and 22 which are the product of the weight and the unit prices 17 printed on the price range plates 14 and 19. These sets of computed value characters 21 and 22, which are identical, are arranged so that they alternately face the merchant's and the customer's sides. The blank spaces on the price range plates register with those sets which indicate the values on the opposite side.

Removably secured to the flange 12 by the screws 23, 24 and 25 is a cover plate or frame 26 having an opening or window 27 in which a plurality of spherical lenses are mounted. These lenses are trimmed to a rectangular shape so that when mounted in the frame they completely fill the window 27 therein. The lenses 28, 29, 30, and 31 are of such magnifying power and are mounted at such a distance from the chart 4 that the characters on the chart when viewed through the lenses are magnified two dimensions, both vertical and horizontal. A set of frusto-pyramidal lens cells 32, 33, 34, and 35 are mounted directly in the rear of the frame 26 and secured to it by the screws 36 so that a lens cell is positioned on the back of each lens as shown in Figure II. The openings of the forward ends of the cells are of substantially the same shape and have the same area as the lenses. The areas of the rear openings of these cells adjacent the chart surface are substantially one-fourth the areas of the lenses. Hence, the portion of the chart viewed through each of the lenses is one-half as high and one-half as wide as the face of the lens, but because both the height and the width are magnified two dimensions the portions of the chart viewed through the lenses appear to be substantially co-extensive in area with the lenses and the interior of each lens cell as seen through its lens appears as a rectangular passage. The walls appear not to converge but to extend parallel to each other rearwardly from each edge of the lens; thus, adjacent sides of each lens cell appear to merge into one thin wall extending directly to the rear (see Figure I).

Since the cells are so positioned that the rear ends of the openings register with the boundary lines of the sets 21 of computed value characters, which face in one direction, only these are visible to the merchant, the sets 22 being eclipsed. The visible computations appear to extend unbrokenly across the entire width of the chart. Since the sets 22 which face the customer's side of the scale are identical with the sets 21, and as the magnifying means comprising the lenses 37, 38, 39, and 40, the cells 41, 42, 43, and 44 and the frame 45 is similar in construction and effect, the same values will be indicated for the same increment of commodity for each of the unit prices to both the customer and the merchant on chart fields which appear to occupy the entire width of the chart, because of the optical effect explained hereinbefore.

Two bands 46 and 47 of weight indicia are also provided on the chart to respectively indicate the weight of the commodity to the merchant and the customer in the usual manner. Reading lines 48 are stretched along the chart on both the merchant's and customer's sides to indicate the figures and graduations to be read.

Since the chart is seen apparently at the end of a rectangular passage the walls of which are parallel, the operator instinctively takes the position directly before the lens just as he instinctively looks through the center of a peep sight of a rifle. For this reason, there is no probability of an error in reading caused by either horizontal or vertical parallax. It is impossible to see the indicated value from a position in which a price appears to correspond to the wrong computed value or appreciable error can occur in reading the comparative position of a graduation and the reading line 48.

Because of the grouping of a comparatively small number of price characters into a set behind each of the four lenses, the finding of a required price is greatly facilitated.

I have shown the lenses of such size that four of them are required for co-operation with a chart of the size illustrated. Obviously, a longer chart will require more or larger lenses. It is also obvious that more smaller lenses, or fewer larger lenses, can be employed with a chart of given length.

The embodiment of my invention herein shown and described is to be regarded as illustrative only and it is to be understood that the invention is susceptible to variation, modification and change within the spirit and scope of the subjoined claims.

Having described my invention, I claim:

1. In a device of the class described, in combination, a chart, said chart bearing identical sets of characters, each of said identical sets occupying a part of its length, means on each side of said chart for hiding one of said sets of characters, and magnifying means on each side of said chart for causing the unhidden set of characters apparently to occupy the whole length of said chart.

2. In a device of the class described, in combination, a chart, said chart bearing characters, adapted to be read on one side, occupying a part of its length, means for hiding the part of said chart not occupied by said characters, and magnifying means for causing said characters apparently to occupy substantially the whole length of said chart; said chart bearing other characters, adapted to be read on the opposite side, occupying another part of its length, other means on said opposite side to hide the part of said chart not occupied by said other characters, and other magnifying means on said opposite side to cause said other characters apparently to occupy substantially the whole length of said chart.

3. In a device of the class described, in combination, a rotatable cylindrical chart, said cylindrical chart bearing characters, adapted to be read on one side, occupying a part of its length, means on said side for hiding the part of said chart not occupied by said characters, and magnifying means on said side for causing said characters apparently to occupy substantially the whole length of said cylindrical chart; said cylindrical chart bearing other characters, adapted to be read on the opposite side, occupying another part of its length, other means on said opposite side for hiding the part of said chart not occupied by said other characters, and other magnifying means on said opposite side to cause said other characters apparently to occupy substantially the whole length of said cylindrical chart.

4. In a device of the class described, in combination, a cylindrical chart, said cylindrical chart bearing characters, adapted to be read on one side, occupying a part of its length, magnifying means on said side for causing said characters apparently to occupy substantially the whole length of said cylindrical chart, said cylindrical chart bearing other characters, adapted to be read on the opposite side, occupying another part of its length, and other magnifying means on said opposite side to cause such other characters apparently to occupy substantially the whole length of said cylindrical chart.

5. In a device of the class described, in combination, a cylindrical chart bearing spaced sets of computed values occupying part of its length, a plate bearing spaced sets of unit prices for identifying said computed values occupying a part of its length stationed immediately in front of said chart, fixedly positioned means for hiding the part of said cylindrical chart and said plate not occupied respectively by said computed values and said unit prices, and fixedly positioned magnifying means for causing said spaced sets of computed values and unit prices to appear unspaced and to occupy substantially the whole of the length of said chart and said plate.

6. In a device of the class described, in combination, a cylindrical chart bearing spaced sets of computed values, a plate bearing spaced sets of unit prices for identifying said computed values, occupying a part of its length stationed immediately in front of said chart, and fixedly positioned means for causing said spaced sets of unit prices to appear unspaced and apparently to occupy substantially the whole length of said plate, said fixedly positioned means comprising magnifying lenses and means for eclipsing such spaces between said sets of unit prices.

7. In a device of the class described, in combination, a cylindrical chart bearing spaced sets of characters, adapted to be read on one side of the cylinder, occupying part of its length, said cylindrical chart bearing other spaced sets of characters, adapted to be read on the opposite side of said cylinder interdisposed among the first said sets, a plate bearing spaced sets of correlated unit prices in registry with said spaced sets mounted in front of said cylindrical chart and having blank spaces interdisposed among said sets of unit prices, another of said plates being stationed on the opposite side of said cylindrical chart and bearing similar sets of unit prices and blank spaces, and means comprising spherical lenses stationed on both sides in front of said cylindrical chart and plates to cause said spaced sets of characters to appear unspaced and hence apparently to occupy the whole length of said cylindrical chart.

8. In a device of the class described, in combination, a cylindrical chart bearing sets of computed value characters adapted to be read on one side and ranging numerically from left to right, other sets of computed value characters interdisposed among the first said sets adapted to be read on the opposite side, said interdisposed sets ranging numerically from right to left, a plate bearing unit prices to register with said first sets stationed on one side of said chart and having blank spaces interdisposed among said sets of unit prices registering with said second sets of value characters, another plate bearing similar unit prices and blank spaces to register with said second set of computed value characters on the opposite side, a plurality of magnifying lenses stationed on each side of said chart for magnifying said sets of computed value characters and price characters, and means on each side for eclipsing the computed value characters and unit price characters not there magnified.

9. In a device of the class described, in combination, weighing mechanism and indicating means associated therewith, said indicating means comprising a cylindrical chart bearing two identical interdisposed sets of computed value characters adapted to be read simultaneously by two different persons standing on opposite sides of said weighing mechanism, means comprising a frame, a plurality of lenses mounted within said frame, a frusto-pyramidal open ended cell stationed directly in the rear of each lens and said lenses and said cells on one side of said weighing mechanism being so stationed and disposed as to disclose and magnify only one set of said plurality of sets of computed value characters.

10. In a device of the class described, in combination, indicating means comprising a cylindrical chart, a band of value characters marked on said chart, magnifying means comprising a lens fixedly positioned in front of said chart, an open ended frusto-pyramidal cell disposed between said chart and said lens, and the ratio of the widths of the openings in the front and the rear of said cell being substantially equal to the magnification of said lens at its distance from the chart.

11. A scale having a weight controlled computing drum chart provided with a set of spaced apart fields of value columns having characters readable in upright position from one side of the scale and each column being based on a different unit value factor, the chart being also provided with a duplicate set of value columns arranged in fields between the first-named fields and having their characters readable in upright position from the opposite side of the scale, and horizontally magnifying devices, one at each side of the scale for providing magnified readings of duplicate indications at the opposite sides of the scale, each device comprising a plurality of lens elements, one in front of each upright field and overlapping the adjacent relatively inverted fields to provide an undistorted, full, magnification of the relatively upright associated field.

12. A scale having a weight controlled computing drum chart provided with a set of spaced apart fields of value columns having characters readable in upright position from one side of the scale and each column being based on a different unit value factor, the chart being also provided with a duplicate set of value columns arranged in fields between the first-named fields and having their characters readable in upright position from the opposite side of the scale, and horizontally magnifying devices, one at each side of the scale for providing magnified readings of duplicate indications at the opposite sides of the scale, each device comprising a plurality of lens elements, one in front of each upright field and overlapping the adjacent relatively inverted fields to provide an undistorted, full, magnification of the relatively upright associated field, and means at each side of the scale for isolating the adjacent relatively inverted fields from each other to conceal from view through each lens all the fields but the one associated therewith.

13. In a device of the class described, in combination, a cylindrical chart bearing spaced series of value characters occupying part of its length, means for magnifying said characters and apparently causing them to occupy substantially the whole length of said chart, said chart bearing other spaced series of value characters occupying another part of its length, and means displaced from the first said means angularly about the axis of said cylindrical chart for magnifying said other spaced value characters and apparently causing them to occupy substantially the whole length of said chart.

CHARLES O. MARSHALL.